Aug. 9, 1955     G. P. HEINER     2,714,779
FISHING LURE
Filed Sept. 22, 1950
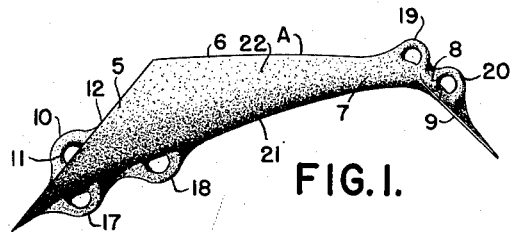
FIG. 1.
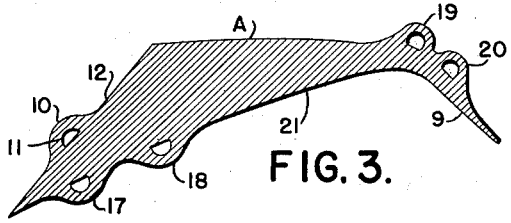
FIG. 3.
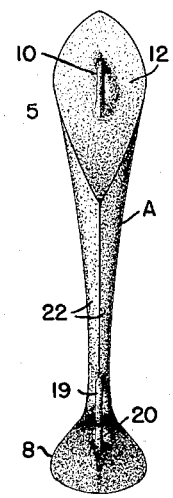
FIG. 4.
FIG. 2.
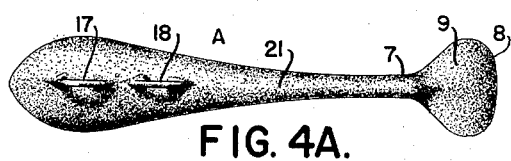
FIG. 4A.
FIG. 5.
FIG. 6.
FIG. 10.
FIG. 7.
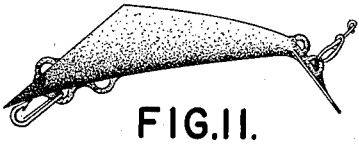
FIG. 11.
FIG. 8.
FIG. 9.
INVENTOR
Gley P. Heiner
BY
ATTORNEY

United States Patent Office 2,714,779
Patented Aug. 9, 1955

2,714,779

FISHING LURE

Glen P. Heiner, Salt Lake City, Utah

Application September 22, 1950, Serial No. 188,314

1 Claim. (Cl. 43—42.23)

My invention relates to fishing lures and has for its object to provide a new and highly efficient lure for trout, bass or other game fish, which lure is made of aluminum, plastic or other suitable materials, so designed that it will ride properly in the water and will have the correct amount of action to attract the fish.

The fishing lure has a body which in transverse section in general simulates the transverse section of a fish, having a height greater than its thickness, said body being formed with flat sides and a curved belly portion, said sides being joined together at their upper edges in such a manner that they appear as inverted V-shaped sides flowing into a rounded belly when viewed transverse section. The large front end of the body has a plane face inclined with respect to the longitudinal axis of the body in a forwardly and downwardly extending manner which may be described in shape as an inverted V at the top and a curved sidewalled V at the bottom, said side walls and bottom being joined in rounding effect. The body taper is different in elevation and plane due to the body cross section, the tail end having a planar fan-shaped tail inclined with respect to the body longitudinal axis in a downwardly and rearwardly extending manner, the face and tail being in planes which are approximately at right angles to each other. The tail is blended into the body by curves, the upper and lower edges of the body when viewed from the side appear as sharp lines contrasting to the body and tail juncture curves. The entire lure is well balanced in appearance by proportioning of its parts. A multiplicity of eye openings are formed on the body in substantial axial alignment as to each other, said eye openings to be utilized to attach either hooks or fishing line thereto.

A still further object is to provide a fishing lure which will have a tail formed at an angle to the body such that the tail acts as a plane against which the water strikes, thereby causing greater wobble in the action of the lure, said tail being so mounted that the force of the water on the tail surface will tend to elevate the tail end of the lure.

A still further object is to provide a lure which will more accurately imitate the swimming action of a startled or wounded minnow in the water, thereby attracting more fish to strike the lure, and which lure has the hooks attached in such a position that there will be less chance of the fish missing one or the other of the sets of hooks, insuring a greater catch.

These and many other objects I accomplish with the device illustrated in the accompanying drawings in which similar numerals and letters of reference indicate like parts throughout the several views and as described in the specification forming a part of this application and pointed out in the appended claim.

In the drawings:

Figure 1 is a side elevation of the lure in the position it will assume when being drawn through the water.

Figure 2 is a front view of the lure shown in Figure 1.

Figure 3 is a longitudinal sectional view through the fish lure taken along line 3—3 of Figure 2.

Figure 4 is a top view of the lure shown in Figure 1.

Figure 4A is a view of the underside of the lure shown in Figure 1; which is termed the belly of the lure.

Figure 5 is a side elevation view of the lure showing the hooks secured to the bosses of the second loop at front belly eyes and at tail eyes.

Figure 6 is a side elevation view of the lure showing the fish line attachment to the proper eye opening for forward swimming action of the lure with the fish hooks hanging from the eye openings.

Figure 7 is a side elevation view of the lure showing the fish line attached to the proper eye opening for forward swimming action with the front fish hook snubbed-up and the tail fish hook hanging from eye opening.

Figure 8 is a side elevation view of the lure showing the fish line attached to the proper eye opening for forward swimming action with the fish hooks hanging from eye openings with the front hook in forward position.

Figure 9 is a side elevation view of the lure showing the fish line attachment, to a swivel, connected to the proper eye opening for spinning action with the fish hook placed in the proper eye opening for such spinning.

Figure 10 is a side elevation view of the lure showing the fish line attachment to a swivel, and attached to the lure for spinning action with fish hook baited.

Figure 11 is a side elevation view of the lure showing the fish line attachment in the proper eye opening on the tail, with the fish hook properly placed for backward swimming action called "crawfishing" the lure.

In the drawings I have shown the body of the lure as a tapered body A having greater length than width and having a larger head 5 from which the tapered body 6 extends and terminates in a narrow end 7, said body being substantially triangular shaped when viewed in side elevation. A tail 8 is formed on the tapered end of the body 6 and fans out at an angle to the body, the tail being substantially fan or fish tail shaped. The lower flat surface 9 of the tail 8 is forwardly positioned when the lure is being drawn through the water from the head end and acts as a rudder causing the water currents to separate and thereby impart to the lure an oscillating movement simulating the swimming action of a fish; and when the fishing line is attached to some other place on the lure this tail causes the body to oscillate, vibrate or spin depending upon the position to which the line is attached. This rudder-like tail is set in a plane which is at substantially a right angle to a plane through the front surface 12 of the lure body A in order to give the correct movement. A drawbar or projection 10 is attached to the flat water-planning surface 12 of the head 5, said projection being formed with an eye 11 to which the fish line may be attached. The eye must be set medially of the sides of the face 12 and the position vertically of the face is substantially medially or just below the medial point but must be so set that when drawn through the water the lure assumes a lifelike swimming action.

The hooks for the lure are mounted as shown in Figures 5, 6, 7 and 8. A hook eye 17 is formed on the lower portion 21 of the body A near the end of the head 5 and another eye 18 is formed rearwardly of the eye 17. On the top of the back side of the tail there are also two spaced eyes (19 and 20 respectively). The flat sides 22 assist the lure balance and simulates the appearance of a fish. Single, or double, or treble gang hooks may be attached to the eyes as desired. Only the double fish hooks are used in the snubbed-up position.

The lure may be fished in three different ways by attaching the line to the correct eye and by placing the fish hooks to the corresponding correct eye.

To this invention I make the following claim:

A fishing lure comprising a solid body having greater length than width and whose side elevation is substantially triangular in shape, one of the ends of said body in end elevation defining a surface having the edges thereof above the horizontal median of that surface converging to a meeting point at their upper end and the edges below the median defining a continuous curve from the bottom of one converging edge to the bottom of the other converging edge, the other end of the lure body having a tail extending downwardly therefrom, the side walls at the latter end of the lure body having a horizontal opening therein and the tail having a projection with an opening therein, the side walls of the projection being substantially in line with that portion of the side walls of the body having a horizontal opening whereby a double shanked hook pivoted in the latter opening may have each of the shanks of its pair of shanks positioned on opposite side of and in engagement with the corresponding sides of the projections and with the connecting part between the shanks mounted in the latter opening, the upper face of the tail and the first named end surface of said body being in planes at right angles to each other, and said first named end surface of said body and the bottom wall of the lure body substantially below the first named end surface having attaching means thereon adapted for connection to a fishing line or fishing hook.

References Cited in the file of this patent

UNITED STATES PATENTS

| | | |
|---|---|---|
| 2,220,133 | Sweeney | Nov. 5, 1940 |
| 2,522,179 | Jensen et al. | Sept. 12, 1950 |
| 2,525,733 | Suick | Oct. 10, 1950 |
| 2,528,861 | Clasen et al. | Nov. 7, 1950 |
| 2,583,616 | Waddell | Jan. 29, 1952 |
| 2,613,470 | Eslinger | Oct. 14, 1952 |

FOREIGN PATENTS

| | | |
|---|---|---|
| 590,865 | Great Britain | July 30, 1947 |